Feb. 19, 1957　　　M. D. HEYMAN　　　2,781,819
INTEGRATED MICA OIL-IMPREGNATED SHEET
Filed Jan. 2, 1951

INVENTOR.
MOSES D. HEYMAN
BY
ATTORNEY

United States Patent Office 2,781,819
Patented Feb. 19, 1957

2,781,819

INTEGRATED MICA OIL-IMPREGNATED SHEET

Moses D. Heyman, Woodmere, N. Y.

Application January 2, 1951, Serial No. 203,944

4 Claims. (Cl. 154—2.6)

This invention relates to the production of an oil-impregnated mica sheet.

In my work with integrated mica such as disclosed in my Patents Nos 2,405,576 and 2,490,129, I have found that when integrated mica is saturated or impregnated with an oil and then heated, the virgin, nascent, or activated surfaces of the flakes that comprise the mica appear to have a catalytic influence on the oil with an apparent rearrangement of the molecules thereof. I noted that the viscous nature of the oil changes first to a jellied consistency and then, as the temperature and time of the heat is increased, the jellied oil solidifies into a strong, hard, and substantially inflexible substance.

After much experimentation, I found that the application of heat was best carried out in two stages. The first in a non-oxidizing or dormant atmosphere to first jelly the oil, and the second in an oxidizing or active atmosphere to harden the jellied oil. I have used various liquid hydrocarbons or oils, both vegetable and mineral. While I have obtained satisfactory results in each instance, ordinary fuel oil which is a petroleum hydrocarbon gave exemplary results and is preferred because of its low cost.

The non-oxidizing heating stage appears to start polymerization of the molecules of oil, and the oxidizing stage completes the polymerization with the result that the product is completely solid and non-porous. Under suitable tests, I have found such an oil-impregnated sheet to be highly resistant to acid and heat—even to an open flame—non-hygroscopic, and highly dielectric.

Accordingly, an object of the present invention is to provide an oil-impregnated integrated mica sheet having the characteristics and properties above set forth.

Another object of the invention is to provide a novel method for producing such a sheet.

I have also found that the two heating stages may be carried out either immediately sequentially or at spaced time intervals. Thus, I find that the intermediate soft state of the sheet permits the same to be applied or wrapped around an article such as a wire conductor or coil, and that the second heating stage, after such application of the sheet, hardens or sets the same on or around the article to render said article insulated against electricity and also against heat.

Accordingly, a further object of the invention is to provide a novel method, as above stated, in which the step of applying an impregnated mica sheet to an article is interposed between the two heating stages employed to convert the impregnating oil into a hardened and polymerized mass.

The foregoing and other objects, features and advantages of the invention will become more clearly evident from the following detailed specification in which exemplary methods of the invention are disclosed, said specification also disclosing products obtained by said methods.

The thickness of the integrated mica sheet employed in this invention is immaterial except that relatively thin and flexible sheets may be continuously passed through the hereinafter-described apparatus, while thicker, inflexible sheets may be conveyed to successive components of the apparatus. In both instances, the methods are the same except that continuity of the method is facilitated by apparatus arranged as illustrated.

Figure 2:
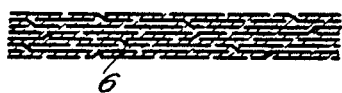
Fig. 2 is a considerably enlarged cross-sectional view of an impregnated sheet according to the invention.
Figure 3:
Fig. 3 is a side view of an electrical conductor wrapped with a sheet produced by the present method.

In the mentioned patents, it is disclosed that integrated mica is comprised of extremely thin flakes or laminae of mica having virgin surfaces and arranged in random fashion whereby said surfaces are in contiguous relation so that the natural cohesive forces, resident in the mica flakes, are effective to cause the flakes to re-cohere and form an integrated sheet. The flakes in such a sheet frequently lie in more than one plane, and the shapes of the flakes are quite irregular. Thus, the sheet has considerable porosity, as suggested in the greatly enlarged cross-section of Fig. 2.

Figure 1:
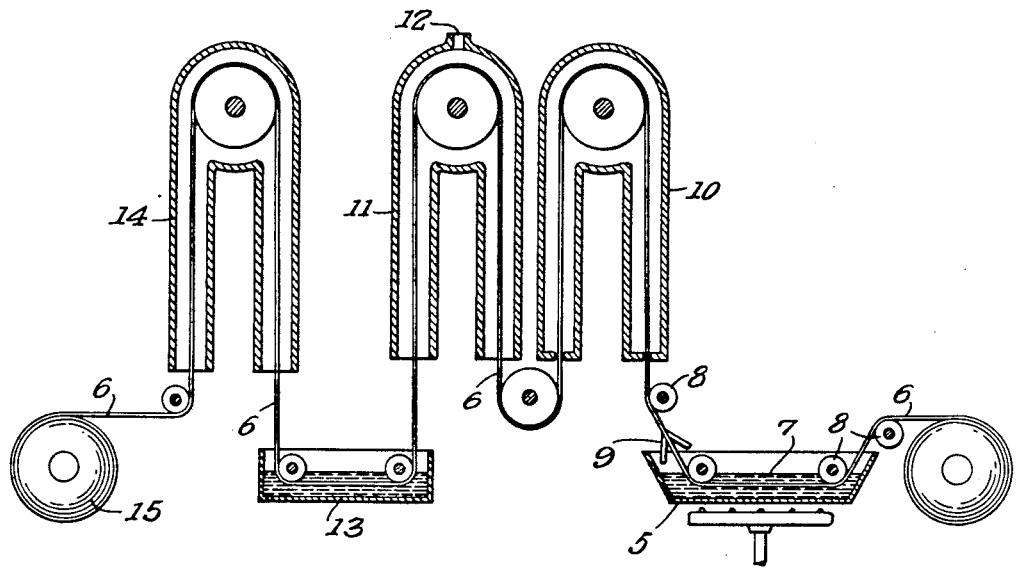
Fig. 1 is a semi-diagrammatic view of apparatus for carrying out a method for producing an integrated mica oil-impregnated sheet.

The apparatus shown in Fig. 1 comprises an impregnation tank 5 through which a sheet of integrated mica 6 is passed, if thin, or dipped, if thick. According to the invention, the impregnation or saturation period will vary depending on the viscosity of the oil 7 in tank 5. Lighter oils require only a few minutes to completely saturate a sheet, while more viscous oils may require several hours. In any case, the saturation period may be reduced by keeping denser or heavier oils warm by applying heat to tank 5. Vegetable oils, such as linseed and soybean oil, as well as heavy and light mineral oils such as fuel and lubricating oil, have been used with good effect. At the present time, fuel oil is thought to be most desirable because of its low cost relative to the other oils.

As shown, suitable rollers 8 are employed to guide sheet 6 through the oil bath 7, and one or more of said rollers may be driven at a low speed to allow every portion of the sheet to become completely saturated with oil.

The impregnated sheet, after it passes out of tank 5, may have its opposite faces wiped dry as by passing the sheet between wipers 9. Then the saturated sheet is directed into an oven 10 that has a dormant or non-oxidizing atmosphere. This oven is substantially enclosed except where the sheet enters and leaves so as to retain a gaseous medium employed to provide the non-oxidizing atmosphere. In practice, I fill the oven with an inert gas, such as carbon dioxide, nitrogen, hydrogen, helium, etc. to, thereby, substantially exclude oxygen. I leave the saturated mica sheet in this atmosphere for approximately one-half hour and apply a heat of approximately 600° F. Under this heat, the sheet is baked and the impregnating oil goes through a stage of polymerization that imparts to the oil a jellied consistency. The sheet that leaves oven 10 retains much of its original flexibility.

The partially treated sheet is then directed into an active or oxidizing oven 11 in which air circulates. A vent 12 in the top of this oven allows for such air circulation. This oven is also heated to about 600° F. and jellied impregnate passes through the oven in about one-half hour and goes through a final stage of polymerization, whereby said impregnate becomes strong and, while hard, has limited flexibility. The thinner sheets will, of course, have more flexibility than the thicker sheets. Because of the dispersion of the impregnate among the pores of the sheet, the same achieves the strength and hardness of the polymerized impregnate.

The resultant product is highly resistant to acid and and heat and is non-hygroscopic, as hereinbefore stated. The product is usable as an insulator of heat and electricity.

Optionally, these sheets may be passed through a resin bath 13 to receive a resin coating, then baked for a suitable length of time in an oven 14 and, finally, wound on a spool 15 as a completed product. Such a baked coating may comprise silicone resin, Glyptol, or a suitable varnish. The baking temperature may vary according to the resin used. 450° F. is approximately correct for silicone resin, while lower temperatures are need for Glyptol and certain of the varnishes. The resin-heating time may vary from one to two hours or to insure complete curing of the resin.

When the sheet is to be used as a winding or wrapping for electrical conductors and coils, the above-described method is varied. The integrated mica sheet is produced in tape width and quite thin so that the tape is flexible. This thin strip is then saturated with oil and baked in a non-oxidizing atmosphere, as above described. The strip is then passed into the oxidizing oven for a relatively short time, say ten minutes, to achieve partial polymerization of the impregnate while leaving the strip sufficiently flexible to be wrapped around small diameters, such as electrical conductors, and around sharp corners.

At this intermediate stage, a coating of resin is applied to the strip by dipping or by spraying, the latter method being preferred to obviate intermixture of the resin and the still plastic impregnate. After applying sufficient heat to remove some of the tackiness of the resin, the strip is wound as a roll similar to electrical and adhesive tapes. This tacky tape may now be peeled off the roll and used to wrap wire conductors, etc. Finally, the wrapped conductor, coil, etc. is baked in an oven for a period varying between twenty minutes and three hours at a temperature between 400° F. and 600° F. to complete hardening polymerization of the impregnate. This last baking time depends on the number of turns or coils of the tape. The result is that the wrapper has high dielectric strength, great resistance to acid and moisture, and is extremely tough.

In the same manner that other insulation wrappings are treated, the above wrapped article may be dipped in wax or be given a similar coating.

Thus, the present method can be varied from a continuous one that produces a sheet of insulation, to one in which the steps of the method are interrupted to apply the sheet or tape, while in an intermediate stage, as a wrapping on an electrical article.

In high voltage uses, proper insulation presents a problem that is frequently solved only at high cost. Many prior insulation practices involve the use of a cellulose, such as paper, which, even though sheathed in a soft metal, such as lead, is attractive to and frequently eaten away by rodents and vermin. The present mica-oil insulation, having no food value whatever, overcomes this shortcoming of prior insulations.

While I have described my invention with respect to certain forms thereof, variations or modifications may well be made without departing from the spirit and scope of the invention as claimed. I, therefore desire to reserve to myself such modifications that may fall within the scope of said claims.

Having thus described my invention, what I desire to claim and obtain by Letters Patent, is:

1. In a mica sheet comprised of thin laminae of mica having activated surfaces and arranged in random fashion whereby portions of said surfaces are in contiguous relation and act on each other to cohere said laminae into an integrated sheet, the remaining portions of said activated surfaces defining a multiplicity of pores among the laminae and the activated surfaces of said pores having catalytic force, a mass of hydrocarbon oil occupying said pores and in a polymerized state induced by said catalytic force.

2. In a sheet according to claim 1: said polymerized hydrocarbon oil being of jellied consistency and, thereby, plastic.

3. In a sheet according to claim 1: said polymerized hydrocarbon oil being hard to impart rigidity to said sheet.

4. In a sheet according to claim 1: a baked resin coating on both sides of said sheet.

References Cited in the file of this patent

UNITED STATES PATENTS

| | | |
|---|---|---|
| 687,532 | Jefferson | Nov. 26, 1901 |
| 1,771,367 | Adams | July 22, 1930 |
| 2,346,579 | Henderson | Apr. 11, 1944 |
| 2,416,143 | Berberich | Feb. 18, 1947 |
| 2,472,533 | Heyman | June 7, 1949 |
| 2,495,186 | Schulman | Jan. 17, 1950 |
| 2,503,759 | Murray | Apr. 11, 1950 |
| 2,562,004 | Watson et al. | July 24, 1951 |